Sept. 17, 1968          S. A. SLENKER          3,401,451
METHOD OF FABRICATING TUNABLE INDUCTORS
Filed Nov. 17, 1964
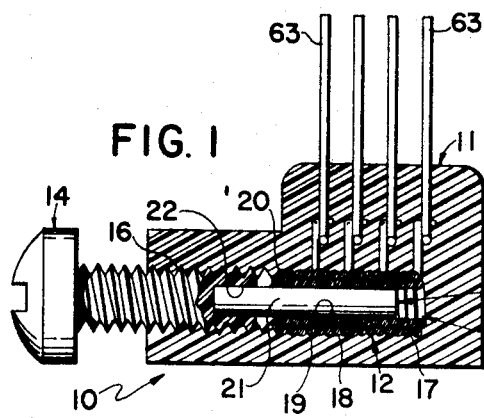
FIG. 1
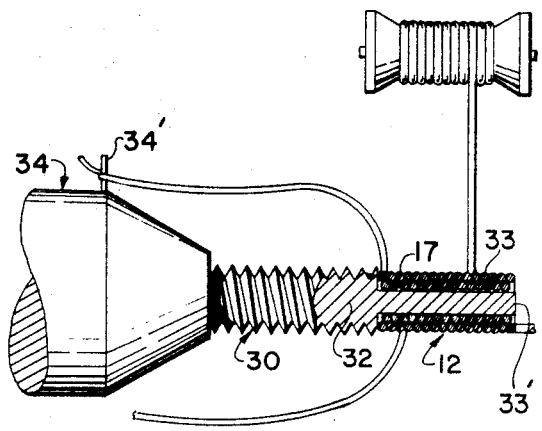
FIG. 2
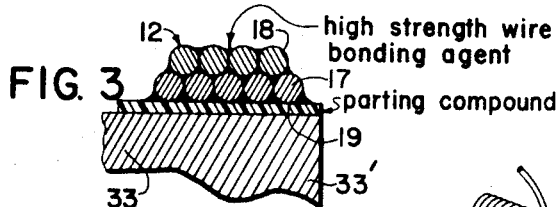
FIG. 3
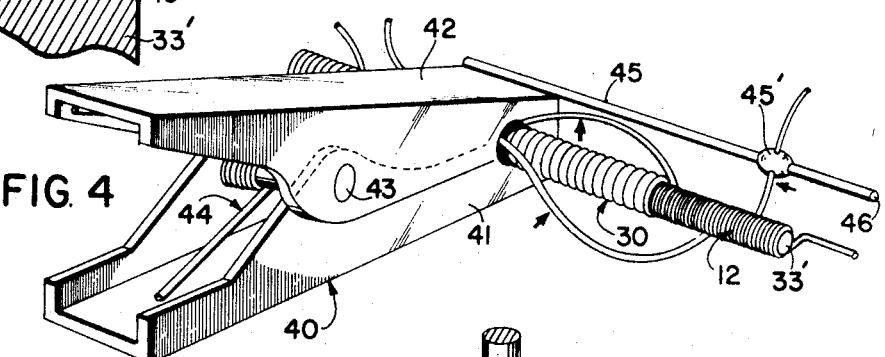
FIG. 4
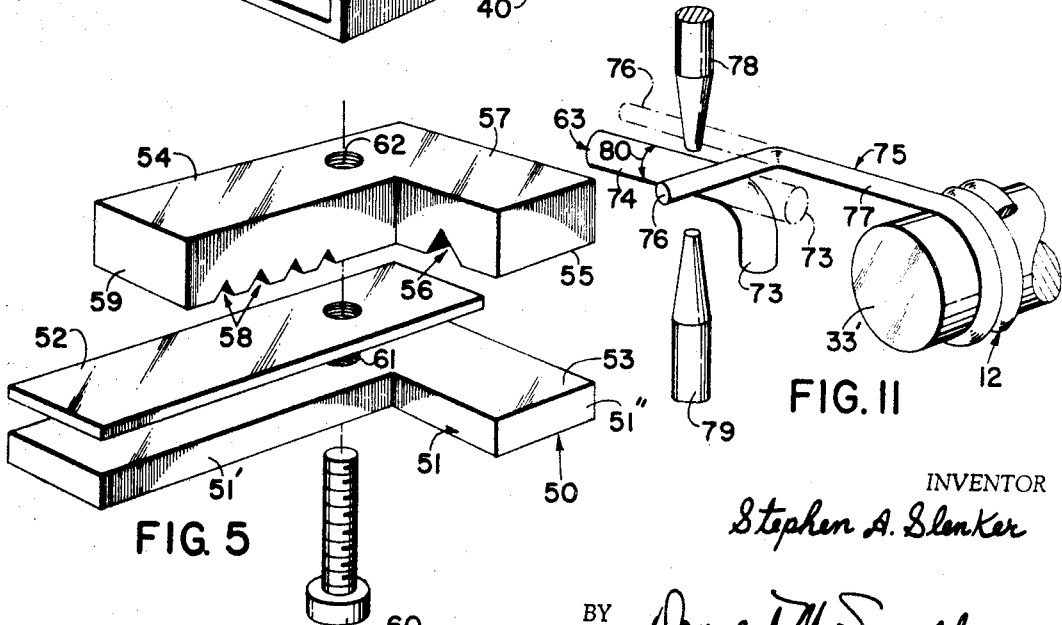
FIG. 5
FIG. 11
INVENTOR
Stephen A. Slenker
BY Donald M. Sandler
ATTORNEY Sept. 17, 1968　　　　　　S. A. SLENKER　　　　　3,401,451
METHOD OF FABRICATING TUNABLE INDUCTORS
Filed Nov. 17, 1964　　　　　　　　　　　　2 Sheets-Sheet 2
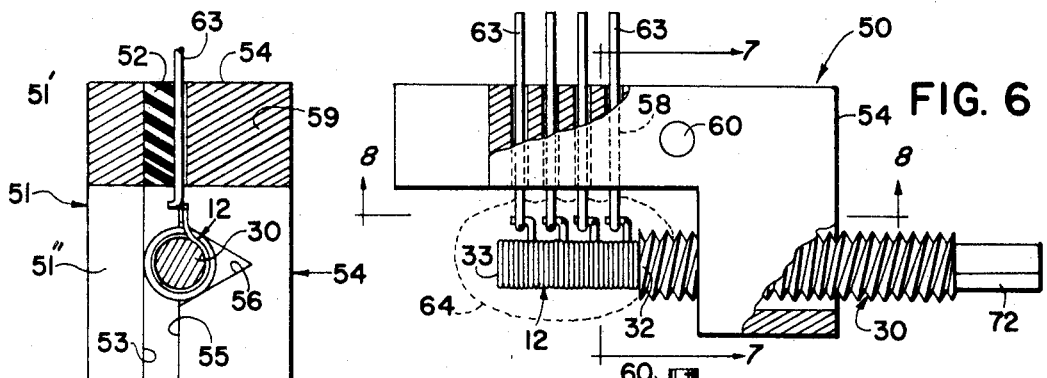
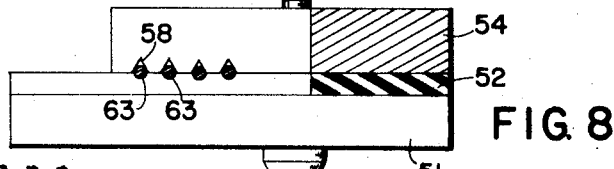
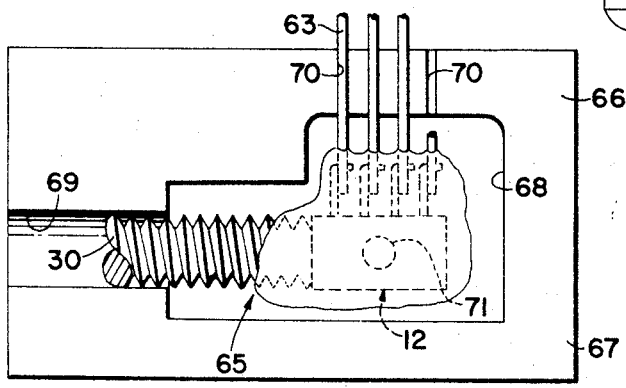
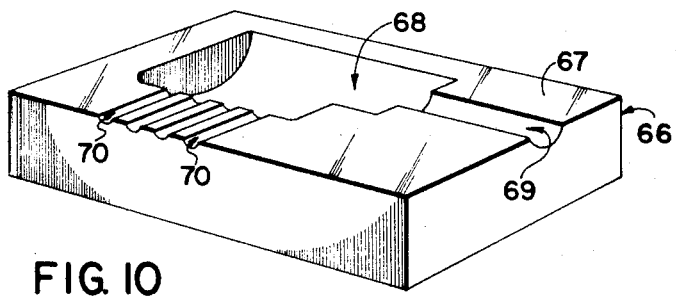
INVENTOR
Stephen A. Slenker
BY Donald M. Sandler
ATTORNEY

United States Patent Office 3,401,451
Patented Sept. 17, 1968

3,401,451
METHOD OF FABRICATING TUNABLE INDUCTORS
Stephen A. Slenker, Billerica, Mass., assignor to Piconics Incorporated, North Billerica, Mass., a corporation of Massachusetts
Filed Nov. 17, 1964, Ser. No. 411,917
6 Claims. (Cl. 29—605)

ABSTRACT OF THE DISCLOSURE

This invention relates to a method for encapsulating a coil in a matrix material using a threaded mandrel which can be unscrewed from the matrix material subsequent to encapsulation of the coil for the purpose of removing the mandrel from the encapsulated coil.

---

This invention relates to a method and means for manufacturing encapsulated miniature inductors of the type provided with a movable tuning slug by which the inductance can be varied between predetermined limits.

Inductors of the type described are constituted by a plurality of continuous helical turns of wire which define a cylindrical coil, the Q of which will be highest when the tuning slug is in direct sliding contact with the inner cylindrical surface of the coil. This being the case, the encapsulated material must engage the outer cylindrical surface of the coil and mechanically support each turn in order to define a rigid self-supporting structure, since winding the turns on a rigid tube to achieve such structure and then encapsulating both the tube and the coil precludes the requisite direct sliding contact between the slug and the inner cylindrical surface of the coil. Those skilled in the art have approached the manufacture of miniature inductors by molding the coil into a plastic housing such that a cavity is provided internal to the coil within which the slug can move. It is here that some of the problems with miniature inductors arise.

It frequently happens that the coil must have overlapping layers of windings with the result that the plastic material of the housing cannot penetrate in and around the innermost layer during the molding process. Consequently, this layer is not mechanically supported by the wall structure of the housing defining the cavity, and is thus neither rigid nor self-supporting. However, even when the coil includes only one layer, the "potting" or encapsulation of the housing into a mass, along with all of the other circuit components, can interfere with maintaining the tuning adjustment of the inductor. This result is caused by the leakage of encapsulating material into the cavity of the housing originally provided for effecting movement of the tuning slug. Such material generally has a temperature coefficient which differs from that of the housing making the tuning of the inductor dependent on temperature and introducing the possibility of mechanically stressing the housing to failure.

It is essential therefore, for the inductor alone to be encapsulated in such a way that all of the layers of the winding are made a part of the wall structure of the cavity, and the integrity of the cavity within the housing is maintained even after the latter is potted with other circuit components. The production of this type of inductor, wherein the envelope of the encapsule may be of the order of magnitude of 0.10″ dia. by 0.25″ long, or even smaller, is the problem to which the present invention is directed. Specifically, the primary object of the invention is to provide a novel method for making inductors which satisfy the above requirements as well as to provide novel tools and jigs by which the extremely small parts can be conveniently handled while practicing such method.

The method applied to the manufacture of miniature inductors may involve winding wire whose diameter is of the order of magnitude of three ten-thousandths to twenty thousandths of an inch on a ten to thirty-five thousandths of an inch diameter end portion of a threaded mandrel to define the coil, and transfer molding a plastic material around the coil and the adjacent threads of the mandrel. The mandrel is extracted by unscrewing it from the plastic material, and the cavity so formed is sealed by a plastic screw to which a ten to thirty-five thousandth of an inch diameter tuning slug is rigidly attached. In order to insure that all of the layers of the coil will be rigidly supported in the molded plastic material, a high strength wire bonding agent or cement, such as high temperature epoxies, coil varnishes or the like, is used to cement the individual turns and layers of the coil into a unitary integral structure prior to the transfer molding process. To obtain the requisite high strength, the cement used must be slow curing, and a special clip must be used for holding the free ends of the coil during curing in order to prevent the coil from unwinding. During the transfer molding operation, the threaded portion of the mandrel and the heavy lead wires welded to the free ends of the coil constitute the supporting and alignment means in a mold cavity. Hence, the angular alignment of the leads relative to the threaded portion of the mandrel is critical, and is achieved using another special jig. In addition, failure of the lead welds in torsion is precluded by welding the lead to the coil wire in a particular manner.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a more complete understanding of the nature and objects of this invention, reference should be had to the following detailed description taken in connection with the accompanying drawings wherein:

FIGURE 1 is a sectional view of a miniature tunable inductor of the type which can be manufactured using the process and tools of the present invention;

FIG. 2 is a view, partly in section, of a coil mandrel mounted in a chuck showing the completion of a second set of windings after a first set had previously been wound and before the coil wire has been severed from a spool of wire;

FIG. 3 is an enlarged view, in section of a portion of the coil wound on the mandrel;

FIG. 4 is a perspective view of a special jig-clip employed for the purpose of keeping the free ends of the coil taut so that the individual turns remain tightly wrapped around the mandrel;

FIG. 5 is an exploded view of another jig-clip specially designed to permit precise alignment between the mandrel on which the coil is wound and the leads to which the coil is to be attached;

FIG. 6 is a plan view, with portions broken away, of the clip shown in FIG. 5 with the mandrel and leads inserted;

FIG. 7 is a view taken along the line 7—7 of FIG. 6;
FIG. 8 is a view taken along the line 8—8 of FIG. 6;
FIG. 9 is a plan view of half of a transfer mold showing the manner in which the mandrel and leads cooperate with the mold to accurately locate and support the coil in the mold cavity;

FIG. 10 is a perspective view of the mold shown in FIG. 9 for better illustrating the mold grooves; and FIG. 11 is a perspective view of the coil and a lead wire for the purpose of showing how the lead wire can be prepared so as to resist torsional loads.

Referring now to the drawings, reference numeral 10 designates an encapsulated miniature inductor of the type described, comprising molded plastic housing 11, double-layered coil 12, tuning slug 13, and non-ferrous screw 14. Housing 11 has therein, centrally located cylindrical cavity 15 connected to the exterior by threaded hole 16 whose axis is colinear with the axis of cavity 15. Cylindrical coil 12 is constituted by a plurality of helical turns of wire 17 having an outer surface 18 and an inner surface 19, and is contained within cavity 15 such that outer surface 18 is in supporting engagement with the surface 20 of the housing defining the cylindrical walls of the cavity. The term "supporting engagement" is used to describe the fact that the housing is molded around the exterior of the coil in such a manner that all of the individual turns of wire are an integral part of the wall structure 20 of the housing thus constituting the individual turns as a unitary rigid self-supporting structure maintaining the inner surface 19 as a cylinder of uniform diameter.

Tuning slug 13 is cylindrical in shape and in slidable contact with surface 19 so that axial movement can take place. As seen in the drawings, slug 13 is of such axial length as to extend axially beyond one end of the coil when the other end of the slug is flush with the other end of the coil. Furthermore, the axially extending end 21 of slug 13 projects into threaded hole 16 and snugly fits into counterbored recess 22 in the threaded end of screw 14. In this manner, the slug is rigidly connected to the screw so that rotation of the latter moves the slug axially within the coil. Preferably, the material of the housing is a thermosetting plastic that requires high pressure and temperature for molding thus defining, when cured, a rather hard and rigid structure. An example of a material that has been used successfully is diallyl phthalate. By fashioning screw 14 of a softer and more resilient plastic, such as nylon for example, the threaded engagement serves a self-locking function in that the static torque will be quite high thus offering excellent vibration resistance. In addition, a nylon screw serves to seal cavity 15 from the exterior of the housing and prevents "potting" compound from entering the cavity and changing the inductance of the unit in the event the latter is potted with other circuit components after assembly into a device.

Before describing the basic process by which the encapsulated inductor shown in FIGURE 1 can be fabricated, the relative sizes of the various components will be listed in order that the reasons for the particular detailed steps of the process and the necessity for the special tools and jigs can be better understood. The housing envelope is essentially cylindrical, about 0.097" diameter x 0.250" long. The screw is about 0.057" diameter with about 80 threads per inch. It projects from the end of the housing from 0.075" to 0.125" depending on the adjustment. The wire size of the coil can be as small as 0.0003 inch, and the outer diameter of the coil can be as small as 0.012" in diameter and can be as long as 0.100".

With this in mind, it can be appreciated that the minute size of the various component parts greatly complicates carrying out the basic idea of this invention, namely winding the coil on a mandrel attached to a threaded rod and transfer molding plastic material over the coil and at least a portion of the threads in order for the housing to entirely support the coil and to form a threaded connection between the housing and the rod by which the mandrel can be withdrawn by the expedient of unscrewing the rod. For example, a coil of such fine wire wound on such a small mandrel has essentially no mechanical strength as between the individual turns and would normally be extremely difficult to handle before and during the molding process, and would not have the desired structural integrity with the housing after molding without providing additional coil supporting means which would result in an air gap between the coil and a tuning slug.

Therefore, the first steps of the process involve applying a parting compound to the mandrel, which in the preferred form (see FIG. 2) is a long threaded rod 30 having at one end 32, a reduced portion 33 that is of uniform diameter. The rod is chucked as shown at 34, and a small amount of high strength slow curing cement is applied to portion 33 over the parting compound. Wire from a spool of coil wire is attached to stop 34' of the chuck, and then wrapped around the threaded portion by rotating the chuck through several revolutions to bring the wire down to the shoulder at which portion 33 joins end 32 of the rod. The required number of turns can then be wound on portion 33 by rotating the chuck through the proper number of revolutions. When the winding operation is completed, the wire wrapped around the threads of rod 30 and the wire connected to the spool maintain the individual turns of the coil under tension preventing their unwinding. Since the cement applied to portion 33 is slow curing in order to permit the uncured cement to seep all around the coil and penetrate between each turn, and to achieve a high strength bond between the individual turns that converts them to a unitary high strength rigid and self-supporting member that can be structuarlly integrated into a transfer molded housing, there is no means present to perserve the turns in tension if the coil wire is severed from the spool and the rod is unchucked before curing is complete. To permit the chuck and the wire on the spool to be used to wind a coil on another rod without waiting for the cement to cure with the first rod chucked in place is the function served by jig-clip 40.

Essentially, clip 40 has a pair of work-engaging jaws 41, 42 shaped to accept rod 30, and mounted for pivotal movement about pin 43. Torsion spring 44 wound around pin 43 is cooperable with jaws 41 and 42 for urging the latter into the work-engaging position shown in FIG. 4 in which rod 30 is clamped between the jaws. An extension rod 45 is rigidly attached to the free end of one of the jaws (in the drawings, jaw 42) and extends away from the jaw in a direction generally parallel to the axis of pin 43. Rod 45 terminates in free end 46.

Returning now to how jig-clip 40 is used to maintain tension on the wire at each end of the coil in order to hold the individual turns tightly in place on portion 33, jaws 41, 42 are slipped over the threaded portion of rod 30 while the latter is still chucked and before the wire is severed from the spool. With the jaws in work-engaging position, the wire wrapped around the threaded portion of rod 30 will be caught between the jaws. Extension rod 45 projects axially in the same direction as rod 30 with end 46 being adjacent free end 33' of rod 30. The chuck can now be rotated by hand until the angular position of clip 40 is such that extension rod 45 abuts the wire extending from the coil to the spool. With the clip in this angular position, a quantity of quick-drying adhesive is applied to the rod and wire as suggested at 45' in FIG. 4. Within a few seconds the adhesive dries and the wire from the spool can be severed, the connection between the wire from the coil and rod 45 serving to maintain tension on the turns of the coil. Rod 30 can now be unchucked and placed aside until the cement is cured. Since clip 40 is much larger than the rod, which is in turn much larger than the coil, the winding of which much be monitored under a microscope, the clip is easily handled. The clip thus provides a convenient way to manually handle the coil and permit curing of the cement without disturbing the coil. Once this cement is cured, the coil turns will not unravel, and rod 30 can be removed from clip 40 by severing the free ends of the coil where indicated by the arrows. These will ultimately be welded to heavy lead wires as described hereinafter.

If a coil having two sets of windings such as illustrated in FIGS. 1 through 4 is to be fabricated on rod 30, the procedure is to wind the sets sequentially. That is to say, one coil is wound as already described in detail above. After the high strength cement is cured, the process is repeated again beginning with the application of additional cement over the one coil followed by the winding of the second coil. Clip 40 is again used to maintain the turns of the second coil in tension and permit rod 30 to be unchucked before the additional cement cures.

As indicated previously, it is desired to transfer mold the plastic housing around not only the coil but a portion of rod 30 adjacent end 32 such that the latter forms threaded hole 16 connected to cavity 15 of the completed inductor shown in FIGURE 1. It is clear, then, that rod 30 must project at least to the exterior of the housing. However, by using a long rod, the latter can project beyond the outer surface of the housing and be used as a part of the coil locating means by which the coil is centered properly in the cavity of the transfer mold. Likewise, the leads connected to the free ends of the coil must project beyond the outer surface of the housing, and by using heavy, stiff wires for the leads as compared to the coil wire, it is possible to utilize the leads themselves as additional coil locating and supporting means. Since both rod 30 and the leads are to be used to key the location of the coil in the mold cavity by mating with fixed matching grooves in the parting surfaces of the mold halves, it is essential that the relationship between the leads and rod 30 be established with some precision. To this end, jig clip 50 shown in exploded form in FIG. 5 is utilized.

The basic components of clip 50 are: a first L-shaped base member 51 having resilient material 52 on one plan face 53 of leg 51'; a second L-shaped base member 54, having in one plan face 55 thereof, a single triangular groove 56 in short leg 57 and a plurality of triangular grooves 58 in long leg 59 corresponding in number to the number of lead wires necessary for the coil; and fastener screw 60 passing through hole 61 in member 51, through a hole in material 52 into threaded engagement with hole 62 in member 54 such that face 55 is in juxtaposition to face 53 with resilient material 52 compressed between face 55 on leg 59 and face 53 on leg 51'. The grooves 56, 58 in the respective legs 57, 59 are at right angles.

In using clip 50 as a jig, screw 60 is first loosened to permit rod 30, to which coil 12 is cemented, to be inserted in angular groove or notch 56 such that coil 12 is opposite angular grooves or notches 58 as shown best in FIG. 6. Heavy lead wires 63 are inserted into grooves 58 until one free end portion of each lead is adjacent to coil 12. These free end portions are first preformed in a manner to be described later, it being sufficient at this time to point out that the free end portions of the coil will eventually be welded to the leads. After rod 30 and leads 63 are inserted in the clip, screw 60 is tightened. The opposite flat sides of triangular notch 56 contact the threaded portion of rod 30 pressing it tightly against plan face 53 on leg 51" of base member 51 as shown best in FIG. 7. Simultaneously, the opposite flat sides of each triangular notch 58 contact a lead wire 63 pressing it into resilient engagement with material 52 on leg 51' of face 53 of base member 51. Material 52 is preferably rubber or the like and of such a thickness that after screw 60 is tightened, the axis of each of the leads passes substantially through the axis of rod 30, and the latter is securely held in fixed relation relative to the leads. The $L/D$ ratio of the notches is such that no misalignment of the members engaged therewith is possible with the result that once the leads are rigidly made a part of the coil structure, which is of course rigidly cemented to the rod, the leads and the rod can be used to align and support the coil in the mold cavity.

The first step in making the leads essentially integral with the coil/rod is of course welding the leads to the coil. This is accomplished as shown in FIG. 11 and will be described in detail later. The second step is to enclose the weld, the coil and portion 32 of rod 30 in slow curing high strength cement, and then cure the latter prior to removal from the clip. The cement envelope is suggested by the broken lines at 64 in FIG. 6. As a result, the cured cement encloses and protects the welds and at the same time holds leads 63 in accurate alignment relative to rod 30 thus permitting removal from the clip.

The resultant subassembly designated by reference numeral 65 in FIG. 9 is then ready for the final encapsulation process. For this purpose, a pair of matching molds is provided (only one is shown at 66 in FIGS. 9 and 10), each with an accurately furnished parting surface 67 containing cavity 68 within which coil 12 is to be centered and supported by rod 30 and leads 63. To this end, axial groove 69 is provided in surface 67 in one end of the mold half (it being understood that the mating mold half also has a groove in register with groove 69 so that when the two mold halves are clamped together in register, the registered grooves surround rod 30 and permit only axial adjustment of the rod to occur). The $L/D$ of these registered grooves and the fit with the rod are chosen such that the coil itself is adequately supported in cavity 68. Matching grooves 70 in surface 67 of each mold half likewise define registered grooves (when the mold halves are clamped in register) that surround leads 63 and limit axial movement of rod 30. Thus, grooves 69 and 70 bear the same geometrical relationship as grooves 56, 58 in clip 50.

Thus, when subassembly 65 is dropped into place in mold half 66, and the other mold half is clamped into matching registration, coil 12 occupies a predetermined and fixed spatial position in cavity 68, being located there by the cooperation between rod 30 and groove 69, and between leads 63 and grooves 70. The injection through aperture 71 of the hot, liquid plastic material causes the cement envelope to be integrally bonded to the plastic material. Removal of rod 30 from the encapsulated inductor is achieved by unscrewing the rod from the plastic housing, a tool grip 72 being provided on the threaded end of rod 30 for this purpose. The cement originally provided to produce a structurally sound coil does not interfere with the withdrawal of portion 33 from the coil since, it will be recalled, a parting agent was first applied to this portion. In FIG. 3, the thickness of this agent is greatly exaggerated and the inner surface of coil 12 is smooth, continuous and substantially the same diameter as the diameter of portion 33.

After the flash is trimmed from the plastic housing, a nylon screw with threads matching the threads of rod 30 and with a tuning slug affixed to one end in such a manner as to be concentric with the screw, is inserted in the threaded hole from which the rod was removed. Because of the structural integrity of the innermost layer of coil 12 with the wall structure of the housing, the slug can have a diameter essentially the same as portion 33 on which the coil was originally wound thereby eliminating any air gap between the coil wires and the slug and achieving maximum coupling between the turns of the coil.

Recalling that leads 63 must be welded to the free ends of coil 12, the approach shown in FIG. 11 will substantially increase the resistance of the weld to failure in torsion. When handling encapsulated components provided with leads that project beyond the plastic housing of the components, it frequently happens during circuit assembly that a lead is bent 90° and inadvertently used as a lever to apply a torque to the portion of the lead passing into the housing. The torsion so applied to an ordinary weld by the lead tends to cause the weld to fail with the result that electrical contact with the lead is destroyed and the component becomes unusable. However, by specially preparing the respective free end portions of the lead, it is possible to achieve a weld which will resist torsional loads. Referring again to FIG. 11, a part of lead 63 is shown, free end portion 73 being bent substantially 90° to the remainder portion 74 of the lead which extends radially toward coil 12. Wire 75 of coil 12 has remainder portion 77 which extends radially from coil 12, and free end portion 76 which is bent substantially 90° to the remainder portion 77 such that portion 76 crosses portion 74 of the lead at substantially a right angle. Portion 76 of wire 75 is juxtaposed with remainder portion 74 of lead 63 as shown in the drawings such that the point of contact is close as possible to portion 73. With the portion 76 contacting portion 74, welding tips 78, 79 can be pressed against the two portions locally welding the lead to the wires. Torsion applied to portions 74 of lead 63 in the direction of arrow 80 tends only to twist the lead since end 73 is keyed to the plastic housing by virtue of the right angle bend. Failure of the weld will thus occur only when the torsional strain in portion 74 is transferred to the weld region, but this generally cannot occur before the torsional strain causes the lead itself to fail exterior to the housing, since the weld is purposely very close to portion 73 which is keyed to the plastic material and thus acts to resist torsional strain in portion 73 immediately adjacent the bend.

While the drawings and above description relate to a miniature inductor that includes a movable tuning slug, the method of manufacture can also be applied to an inductor having a fixed tuning slug. Thus, instead of using a slug attached to a screw and using the screw to seal the cavity in which the slug can be moved, it is also possible to merely insert a slug into the cavity and seal the ends thereof with high strength cement.

What is claimed is:
1. A method for winding a coil on a mandrel in the form of a long threaded rod having at one end, a reduced portion that is of uniform diameter, said method comprising:
    (a) applying a parting compound to said rod;
    (b) applying a slow curing high strength cement to said reduced portion of said rod;
    (c) helically winding a piece of wire into the cement on said reduced portion before the cement is cured to define a coil with two free ends;
    (d) gripping the threaded end of said rod between the jaws of a clip having an extension thereon so that one free end of said coil is secured between said jaws and said rod and the other free end of said coil is adjacent said extension;
    (e) attaching said other free end of said coil to said extension; and
    (f) curing said cement.
2. A method for fabricating an inductor having an air core into which a slug is adapted to be slidably inserted for the purpose of varying the inductance, comprising the steps of:
    (a) applying a parting compound to a mandrel in the form of a threaded rod having at one axial end a reduced portion of uniform diameter;
    (b) helically winding a wire on said reduced portion to define a coil;
    (c) molding matrix material around said rod in such a way that the other axial end of said rod projects from said material whereby at least said coil is rigidly attached to said material internally thereto; and
    (d) unscrewing said rod from said material to effect its withdrawal from said coil and material.
3. The method of claim 2 including the steps of applying a slow curing cement to said rod before the step of molding said matrix material around said rod so as to bond together the individual helices of said coil, and also curing said cement prior to the molding step.
4. A method for fabricating an encapsulated inductor comprising:
    (a) applying a parting compound to a mandrel in the form of a threaded rod having at one axial end a reduced portion of uniform diameter;
    (b) helically winding a wire on said reduced portion to define a coil;
    (c) clamping said rod and at least two straight, relatively heavy lead wires in a jig such that one free end of each lead wire is adjacent said coil and makes a predetermined angle with the axis of said rod;
    (d) welding the respective free ends of said coil to the respective one free end of each of said lead wires;
    (e) applying a slow curing cement to said coil and each lead wire only in the region thereof where it is welded to a free end of said coil;
    (f) curing said cement so that it forms a mechanical support for maintaining said leads at said predetermined angle relative to the axis of said rod; and
    (g) removing said jig from the rod and leads.
5. A method in accordance with claim 4 including:
    (a) transferring said rod with the cement encapsulated coil at one end to the cavity of one injection mold-half having one groove in the parting surface closely fitting the threaded portion of said rod and at least two other grooves in said parting surface making said predetermined angle with said one groove, said last-mentioned grooves closely fitting said leads;
    (b) placing the parting surface of a mating mold-half on said one mold-half and clamping the two mold-halves together so that said cement encapsulated coil and at least a portion of the threads on said rod are contained in the mold cavity; and
    (c) transferring a thermosetting plastic material into said mold.
6. A method for winding a coil on a mandrel comprising:
    (a) applying a parting component to said mandrel;
    (b) applying a relatively slow curing high strength cement to at least one end of said mandrel;
    (c) helically winding a piece of wire onto the cement before the latter is cured to define a coil having two free ends;
    (d) gripping the other end of said mandrel between the jaws of a clip having an extension thereon so that one free end of said coil is secured between said jaws and said mandrel and the other free end of said coil is adjacent said extension; and
    (e) attaching said other free end of said coil to said extension.

References Cited

UNITED STATES PATENTS

| 3,243,752 | 3/1966 | Lawrence | 29—155.57 X |
| 3,182,384 | 5/1965 | Carlson | 29—155.57 |
| 3,071,496 | 1/1963 | Fromm | 264—272 |
| 2,552,999 | 5/1951 | Pannell | 29—155.57 X |
| 2,459,605 | 1/1949 | Warnken. | |

JOHN F. CAMPBELL, *Primary Examiner.*

JOHN L. CLINE, *Assistant Examiner.*